United States Patent
Hammons et al.

(10) Patent No.: US 6,477,509 B1
(45) Date of Patent: Nov. 5, 2002

(54) INTERNET MARKETING METHOD AND SYSTEM

(75) Inventors: James P. Hammons, Boise, ID (US); Laura L. Silsby, Boise, ID (US)

(73) Assignee: Efunz.com, Boise, ID (US)

( * ) Notice: Subject to any disclaimer, the term of this patent is extended or adjusted under 35 U.S.C. 154(b) by 0 days.

(21) Appl. No.: 09/478,649

(22) Filed: Jan. 6, 2000

(51) Int. Cl.[7] ............................................. G06F 17/60
(52) U.S. Cl. ........................ 705/27; 705/26; 705/14
(58) Field of Search ............................. 705/26, 27, 14

(56) References Cited

U.S. PATENT DOCUMENTS

| | | | |
|---|---|---|---|
| 5,694,551 A | 12/1997 | Doyle et al. | 395/226 |
| 5,710,887 A | 1/1998 | Chelliah et al. | 395/226 |
| 5,717,923 A | 2/1998 | Dedrick | 395/613 |
| 5,724,521 A | 3/1998 | Dedrick | 395/226 |
| 5,754,656 A | 5/1998 | Nishioka et al. | 380/25 |
| 5,774,870 A | 6/1998 | Storey | 705/14 |
| 5,794,207 A | 8/1998 | Walker et al. | 705/23 |
| 5,794,210 A | 8/1998 | Goldhaber et al. | 705/14 |
| 5,797,127 A | 8/1998 | Walker et al. | 705/5 |
| 5,809,242 A | 9/1998 | Shaw et al. | 395/200.47 |
| 5,825,881 A | 10/1998 | Colvin, Sr. | 380/24 |
| 5,838,790 A | 11/1998 | McAuliffe et al. | 380/4 |
| 5,848,397 A | 12/1998 | Marsh et al. | 705/14 |
| 5,855,008 A | 12/1998 | Goldhaber et al. | 750/14 |
| 5,870,717 A | 2/1999 | Wiecha | 705/26 |
| 5,890,137 A | 3/1999 | Koreeda | 705/26 |
| 5,897,620 A | 4/1999 | Walker et al. | 705/5 |
| 5,897,622 A | 4/1999 | Blinn et al. | 705/26 |
| 5,899,980 A | 5/1999 | Wilf et al. | 705/26 |
| 5,926,798 A | 7/1999 | Carter | 705/26 |
| 5,933,811 A | 8/1999 | Angles et al. | 705/14 |
| 5,946,665 A | 8/1999 | Suzuki et al. | 705/26 |
| 5,948,061 A | 9/1999 | Merriman et al. | 709/219 |
| 5,950,173 A | 9/1999 | Perkowski | 705/26 |
| 5,966,533 A | 10/1999 | Moody | 395/702 |
| 6,014,502 A | 1/2000 | Moraes | 395/200.49 |
| 6,014,698 A | 1/2000 | Griffiths | 709/224 |
| 6,026,368 A | 2/2000 | Brown et al. | 705/14 |
| 6,078,740 A * | 6/2000 | DeTreville | 395/500.43 |
| 6,092,049 A * | 7/2000 | Chislenko et al. | 705/10 |
| 6,266,649 B1 * | 7/2001 | Linden et al. | 705/26 |

FOREIGN PATENT DOCUMENTS

EP 643359 A2 * 3/1995 ........... G06F/17/30

OTHER PUBLICATIONS

Pellet, Jennifer, The Future of Electronic Retail, Jan. 1996. Discount Merchandiser, V36N1, p.: 36–46.*

* cited by examiner

Primary Examiner—Douglas Hess
Assistant Examiner—Elaine Gort
(74) Attorney, Agent, or Firm—Robert L. Shaver; Frank J. Dykas; Stephen M. Nipper (57) ABSTRACT

A method and system for communication and trade on a network, in which information is directed at the computer screen of a consumer by merchants of goods, services, or information. A lending partner would provide the initial capital to offer the consumer an incentive for signing up for the system, and for supplying pertinent information about herself. A management system would integrate the merchant information with consumer information, to send a targeted stream of information to the user. Purchases could be made from the system, whether connected to the network or not. Background data transfer or auto-refreshing of data would be options for the system. The lending partner would be repaid for the consumer's incentive from revenues paid into the management system related to each individual consumer transaction.

27 Claims, 5 Drawing Sheets

INTERNET MARKETING METHOD AND SYSTEM

BACKGROUND OF THE INVENTION

1. Field of the Invention

The present invention generally relates to methods of conducting business, and more specifically to a method of conducting business on a communications system or internet.

2. Background of the Invention

Recently, a wide variety of business models have been utilized in conducting business on the global communication network known as the Internet. One of these methods involves bidding on a service or good such as an airplane ticket, and letting providers of that service or good respond if they can meet the bid price. Another method of doing business on the internet includes directing targeted advertising to a consumer in exchange for some action by the consumer. The action by the consumer may be viewing ads from advertisers which are displayed on his computer screen as he uses it. In exchange for viewing these ads, the consumer may receive some incentive, such as free or reduced price computer equipment, free or reduced price subscription to internet connection services, or other free or reduced price goods or services. What these business models lack is a system which reinforces customer behaviors and which also provides mutually beneficial relationships to a number of parties involved in a transaction. These parties can be the internet user, an information provider, a lending partner, and the system management entity. This mutually interlocking and self reinforcing structure of relationships is the focus of this invention.

SUMMARY OF THE INVENTION

The method and system of the present invention utilizes a targeted advertising method and utilizes that concept in an enhanced method and system which provides targeted information to a computer user, and also engages the computer user in a closed loop system which reinforces the mutual interactions of the computer user, information provider, and a lending partner. The method and system utilizes a networked personal computer and a desktop application that delivers targeted product promotions, multimedia advertising, or other targeted information to the system user's personal computer or pc.

The method or system of the invention operates on a computer network in which typically a number of computers can access the network. An information system computer is also linked to the network, and provides information storage, comparison capabilities, and integration functions to the method and system of the invention. The information system computer is the system management entity, and can actually be one or a number of computers which perform the system management functions.

The method and system of the invention is an interlocking and mutually reinforcing series of interactions between four parties. Although each step of the method or system can actually be happening simultaneously with the other steps, the transaction from the point of view of a particular system user can describe a complete cycle of typical transactions. At the beginning of this cycle, funds are received in a management fund from one or more investors. The management fund is part of the system management structure, and can exist on a separate computer from the information system computer, or be on the same computer. It can also reside on a number of computers and include managers and operators who manage the functions of the system. These funds are to be used for providing a viewing incentive to the system user. The investors can be the management fund itself, or some external partner who participates in the system. It can be a bank which is providing money to the system as an investment, and which plans to be paid back. It can also be a consumer lending partner, who may benefit from interaction with the system user, and who may be willing to pay fees to the management fund for the opportunity to interact with the system user. The funds thus received from the investor are used to provide a viewing incentive for one or more of the system users.

This incentive could be in the form of providing a form of internet currency or credit to the system user, so that the system user could use this credit to purchase goods or services from advertisers or vendors on the network. In exchange for this viewing incentive, the new system user would agree to provide user profile information to be stored in the information system computer. This user profile information could include information on a variety of subjects of interest to information providers, such as age, income, number of family members and their ages, and type of occupation. The information could also include more specific information, depending on the arrangement with the system user, and could include birth dates of family members, political inclinations of the system user, buying habits of the system user and his family, shopping preferences of the system user and his family, and other units of information which would be of interest to a merchant, an advertiser, a credit lender, or another information provider such as political or advocacy organizations.

This system user information is gathered into a system user profile and stored, along with similar information from other system users, in the information system computer which manages the interactions of the method for network participation. The method or system also receives from the system user a commitment to view targeted information for a period of time. This commitment could take the form of for instance, a commitment to view targeted information for a period of twelve months. The targeted information would be presented to the system user on his computer screen. It would be displayed along one or more sides of the computer screen so that the majority of his computer screen is still available for use with whatever application he chose to use, and the targeted information would be visible along the margins. The particular form of this targeted information could vary. For instance, it could be present on the screen permanently, or certain units of information could appear periodically. One option is that after a certain period of time, the computer user could elect to turn off the display of targeted information. The targeted information could include a variety of material which had been deemed to be of interest to the computer user.

The next step would be to obtain information from one or more information providers. This could take the form of advertising information about certain products or services from merchants or manufacturers selling those products or services. It could also be information from political or advocacy groups, such as national political parties, groups involved with advocacy issues such as abortion and birth control issues, gun control issues, or environmental issues. The product information would be gathered from the information providers and stored on the information system computer. Along with the product information, the information providers would provide information about the demographics of the preferred target for their particular information. For instance, information provided by a jeweler about jewelry products might include demographic information that it should be displayed to users whose income is greater than $50,000 per year. Information from a number of information providers, each one possibly providing information about a number of products, services or offerings, would be received by the information system computer.

The information system computer would then integrate the system user profile information with the product information provided by information providers. Product information which matches the system user profile information would be selected, and provided to the system user for viewing on his computer screen. The selected product information is sent to the system users computer when the system user connects to the network.

The information provider or providers pays a presentation fee to the management fund, for each unit of information which is presented to the system user. The system user also has the ability of interacting with the product information or advertising. This would typically be by ordering a product, or investigating a product or other information more fully.

If a system user buys a product from an information provider, then the information provider pays a further fee, or sales commission to the management fund.

In this particular example, the cycle is completed when the original investor is paid from the management fund so that the viewing incentives he originally funded are paid for.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive.

DESCRIPTION OF THE PREFERRED EMBODIMENT

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

Figure 1:
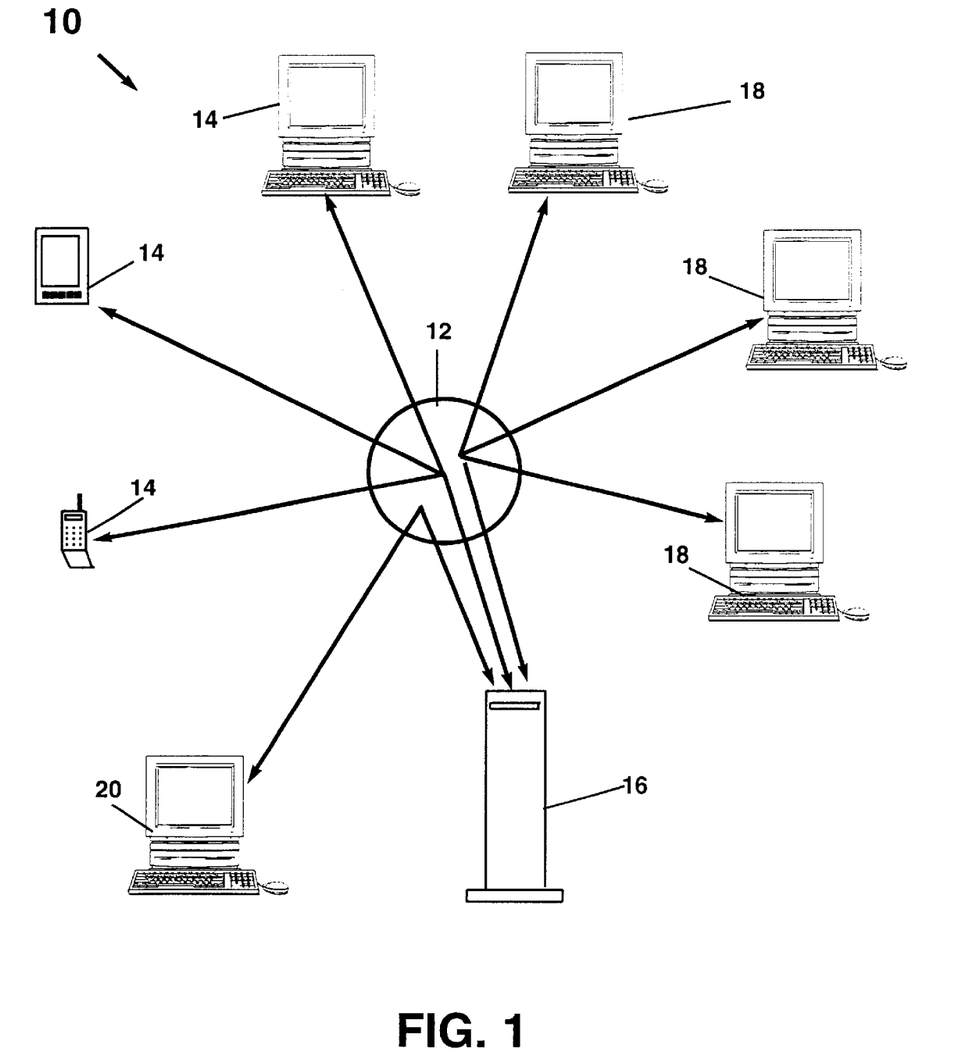
FIG. 1 is a diagrammatic representation of the method and system of network participation of the invention.

FIG. 1 shows an example of an overall environment in which the present invention may be used. This environment includes a network 12, an example of which could be the Internet or some future communications network. A number of computers such as personal computers or information appliances 14, operated by system users are attached to the network 12 and are designated 14 in FIG. 1. These personal computers 14 are connected through the network to one or more information system computers 16. Also connected to the information system computer 16 are a number of computers which are information provider computers 18. Information providers 18 are also connected to the information system computer 16 through the network 12. One other type of party may be connected through the network 12 to the information system computer 16, and that is lending partner 20.

Figure 2:
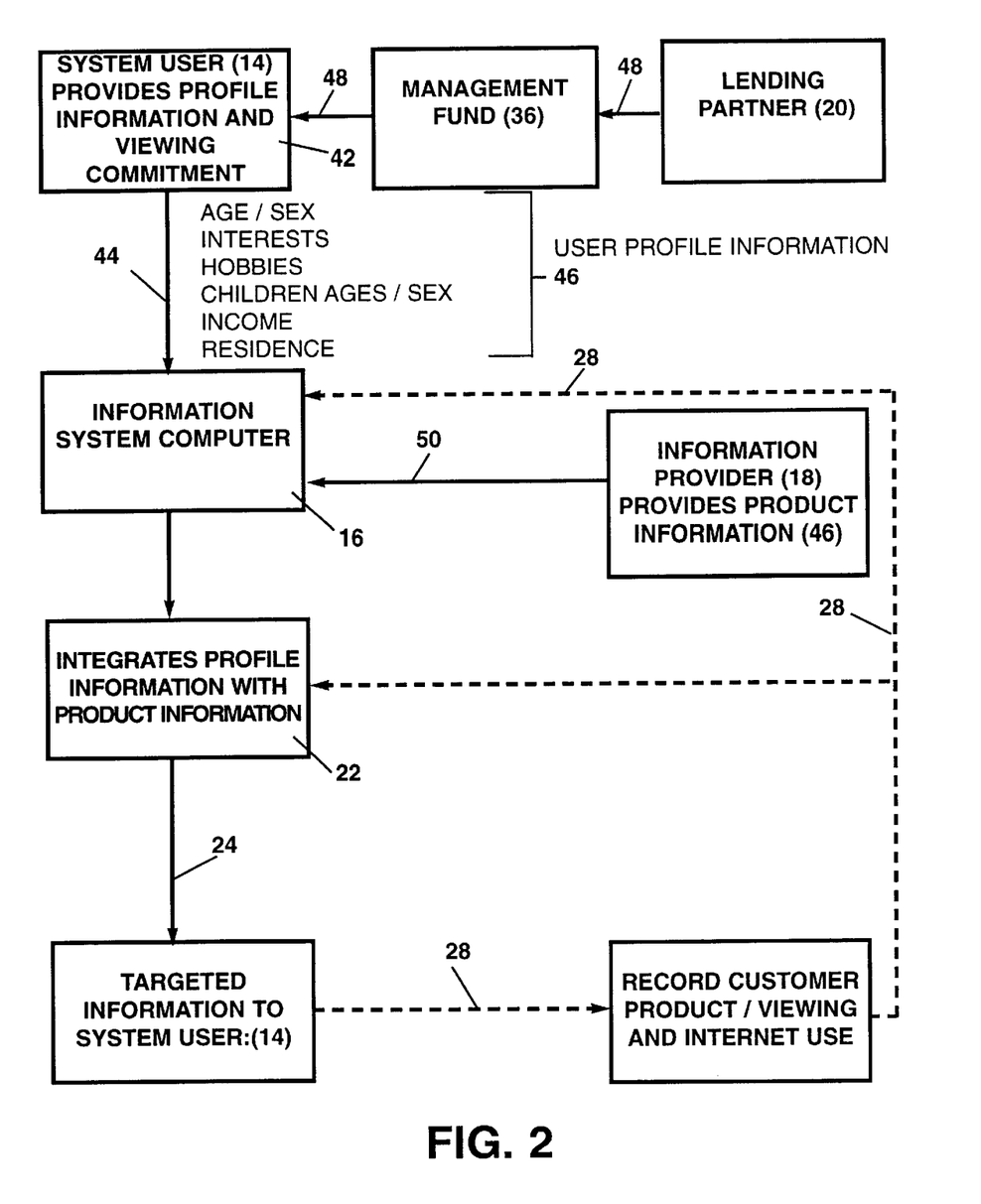
FIG. 2 is a block diagram showing the transfer of information and interactions of the system and method.

The system or method of network participation operates with the number of steps in a cycle, although each of the steps of the cycle may be occurring simultaneously. The system can best be explained by illustrating one particular cycle, with all of its steps, for one particular system user 14. FIG. 2 shows one cycle of the method or system for one system user 14. This cycle begins at the new user login step 42. At this step, the system user provides user profile information which is sent to the information system computer 16 at the load user information step 44. The system user 14 provides profile information 46 such as his age and sex, his interests, his income level, the number of his children and their ages, and his residence. The user profile information 46 can include information of a much more detailed nature and more comprehensive in scope. This could include information about his spouse's shopping habits, their wedding anniversary, the birthdays of some of his relatives, his children's ages, sex and birthdays, his family's hobbies, his political inclinations, and his interest in particular advocacy groups or political parties. In addition to the user profile information 46 which the system user 14 sends to the information system computer 16, the system user 14 also makes a commitment to view targeted ad information (optionally, the commitment may be required for a period of time, such as 12 months or 18 months).

In return for the system user's 14 commitment to view targeted advertising, and for providing user profile information, a lending partner 20 provides an incentive 48 to the system user 14 via the management fund 36. This incentive can take many forms, including a cash payment, credit towards purchases over the network 12, and discounts on future purchases over the internet or at other outlets. Optionally, the offer may be confirmed by the first purchase a user makes on the system.

Figure 3:
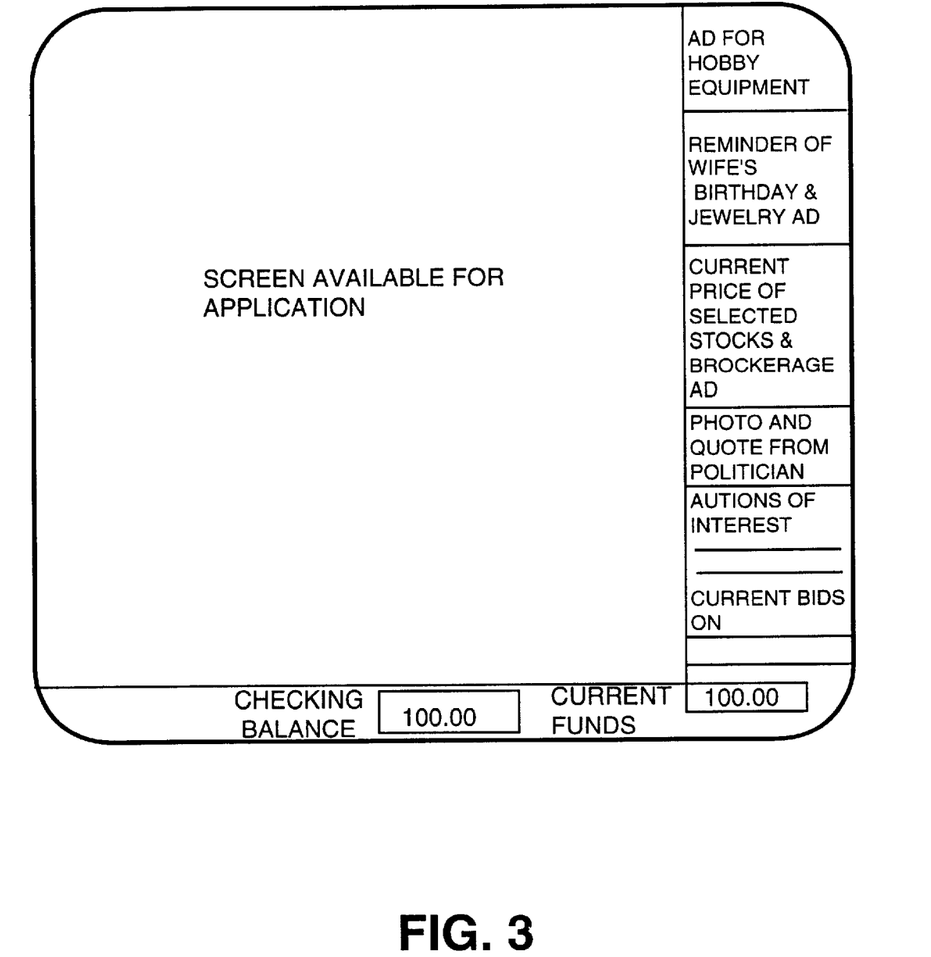
FIG. 3 is an example of a screen display of the system.

An information provider 18 provides information about products and services to the information system computer 16 information which he is interested in displaying to system users 14, at step 50. In one configuration of the system, the information providers would be merchants, and the information they provide would be concerning various products and services which they sell. For instance, a merchant could be a seller of electronic products, and the information he provides to the information system computer would include photographs of his products, description of his products, prices of each product, and also profile information which can be used to associate a product with a system user. For instance, a particular information provider 18 may be a merchant who is interested in selling a particular piece of software to a system user. The information provider may indicate that the type of system user who is likely to be interested in this software is a system user who has children between the ages of 6 and 10 years, and who has an income of greater than $50,000 per year. He may further indicate that this information is best suited for a consumer who lives in a western state, and who has at least a college level of education. These two streams of information, one from the system user 14 and one from the information provider 18, are handled by the information system computer 16 in an integration step 22. At integration step 22, particular information from the information provider 18 is selected for a particular system user 14. At step 24, the selected information for a particular system user 14 is sent to the system user 14. The selected information is displayed on the system user's 14 computer screen, in a manner so that he can continue to operate his computer for its normal tasks. Typically the information would be displayed along one or both sides of the computer, or along the top and/or bottom of the computer. FIG. 3 shows an example screen of how targeted information 24 could be displayed on a system user's 14 computer screen. The information displayed in FIG. 3 is meant to be an example of one type of information which may be displayed to the user, and is not meant to limit the scope of the invention or the type of information displayed.

FIG. 2 shows another optional component of the system, which is a feedback loop 28, in which the system user's activity on the computer in relation to network use and product viewing are recorded for periodic transmittal to the information system computer 16. This information can also be sent to the integration step 22, to modify the selection of information which is directed to the system user 14 to match the system user's recorded Internet and product viewing activity.

Figure 4:
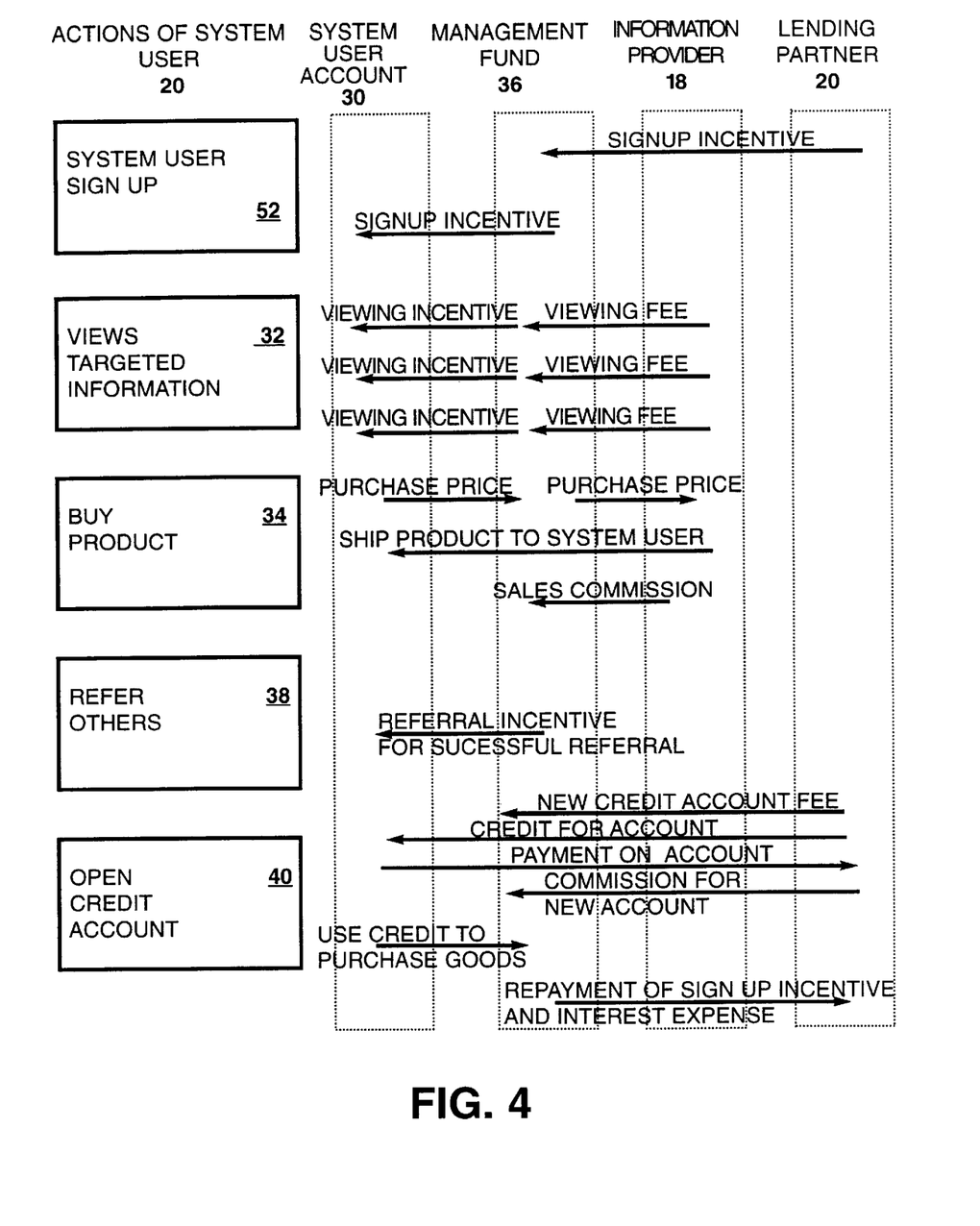
FIG. 4 is a diagram of the flow of money in the system or method.

FIG. 4 is a diagram which illustrates the general flow of money or other currency in the system. The system user signs up with the system at block 52, the sign up step. The system user's account is shown as a column identified as 30. This is the find of money which is available to the system user to purchase products or services using the system 10. Associated with the sign up step 52, the management fund 36 credits the system user's account 30 with a sign up incentive. This incentive can take the form of money or of some other currency. Funds for the sign up incentive are also transferred from lending partner 20 to the management fund 36. Incentives could be assigned for other system related activities, such as subscribing to system based e-mail, purchasing system products such as phone services, or participating with the system in other ways.

The block below the sign up step 52 is block 32, at which the system user views targeted information. As discussed above, this would typically be information relating to products for sale, but could also be other types of information such as information related to politics, or advocacy groups for causes the system user is interested in, based on information from his user profile. For viewing the targeted information at block 32, the system user earns a viewing incentive, which is added to the system user's account 30. The information provider 18 also pays a viewing fee to the management fund 36. The viewing fee paid by the information provider 18 to the management fund 36 would typically be somewhat higher than the viewing incentive paid by the management fund 36 to the system user's account 30, thus resulting in a net increase in the management fund 36.

At block 34, the system user may also buy products which he has viewed in block 32. When the system user buys products at step 32, funds from the system user's account 30 are transferred to a management fund 36. The management fund 36 is basically the bookkeeping and accounting system for the method and system of the invention, and keeps track of all the system user's accounts and handles the transactions with the lending partner and the merchants. Step 34 could also be set up so that the purchase price goes directly to the information provider 18. When the information provider is a merchant, the transaction would be completed when a product is shipped to the system user. FIG. 4 shows a product being shipped to the system user account, but if it were a physical product, it would be physically shipped to the system user. Other types of transactions could be that the system user transfers funds to an information provider such as The Sierra Club, and in return receives reports on how the funds are being utilized. If the information provider were a political organization, the information provider might only return a thank you note to the system user. The information provider also pays a sales commission into the management fund for each completed transaction with the system user. This is another way in which the management fund increases in value. The same entity which manages the management fund 36 can also be an information provider, and offer products for sale.

Below the purchasing step 34, the system user may refer others to enroll in the system at block 38. For each referral or successful referral at block 38, the management fund credits to the system user's account 30 a referral incentive.

At block 40, the system user may also open a credit account with a lending partner 20. This step opens a credit account between the user and the lending partner, in which the lending partner provides credit to the system user's account for purchases and/or a physical credit card to the user, and the system user makes credit card payments which include interest to the lending partner 20. Other potential interactions shown relating to this step on FIG. 4 include the lending partner 20 paying a new account sign up incentive to the management fund 36 Other potential transactions relating to this step include a payment on the credit account is transferred from the system user's account 30 to the management fund 36 or directly to the lending partner 20. The last transaction in FIG. 4 shows the management fund 36 repaying the sign up incentive with interest to the lending partner 20 over time from the advertising and commerce revenues received in the management fund associated with the system user.

Figure 5:
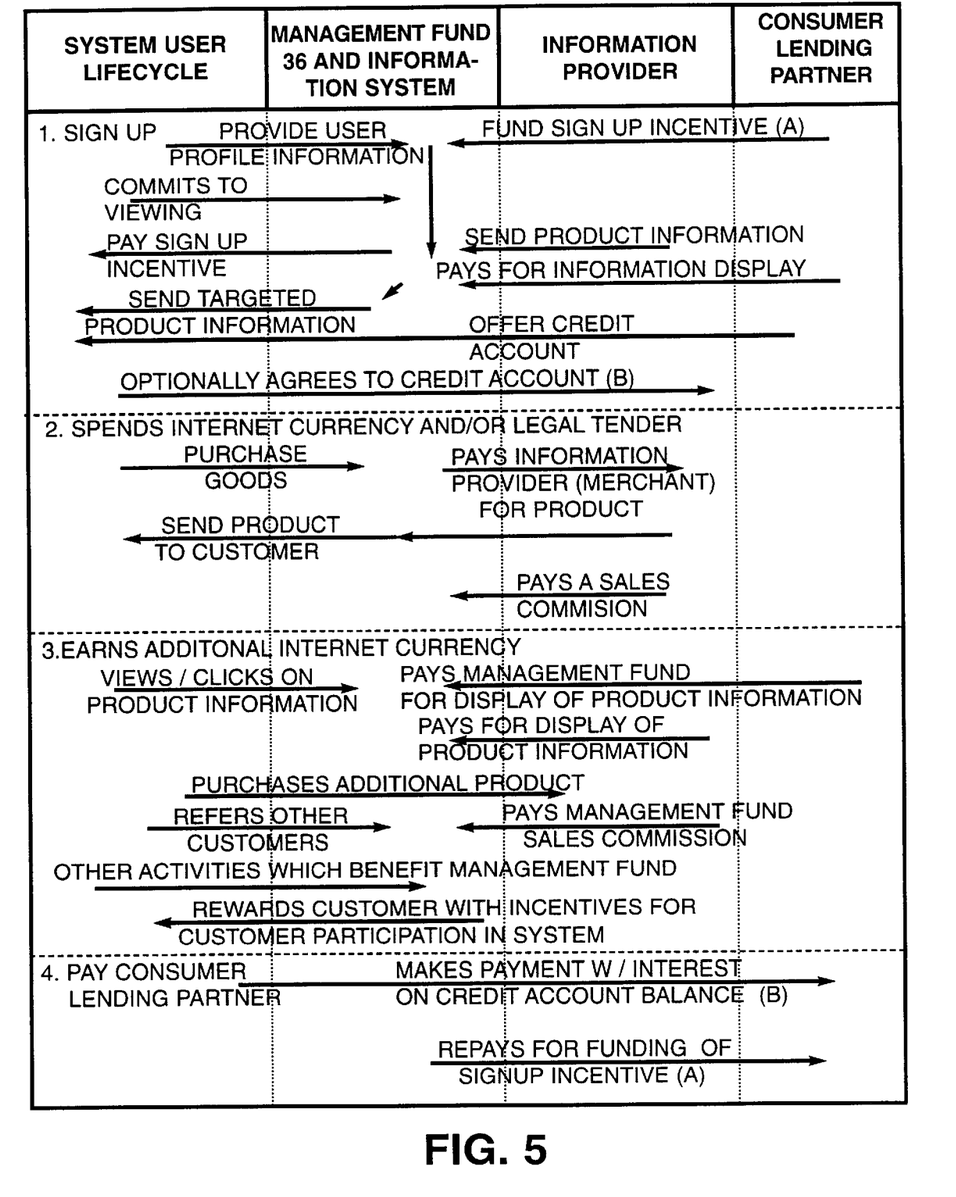
FIG. 5 is a chart of the actions taken by the participants in the system.

FIG. 5 presents further detail of the interactions between the system user 14, the management fund 36, information system 16, the lending partner 20, and the information provider 18. The activities shown in FIG. 5 include all the steps in approximate chronological order for one cycle of a transaction for one system user. The first row shown in FIG. 4 is for activity related to the sign up of a new system user. As shown in the first row of FIG. 5, the system user provides user profile information which is routed to the information system computer 16. Depending upon the configuration of the system, the user profile information can remain within the management fund in information system 16, or it (or portions of it) can be routed on to the consumer lending partner or the information provider 18. The consumer lending partner 20 pays a sign up incentive for that customer and potentially a bounty to the management fund 36, which in turns pays all or part to the system user as a sign up incentive. The information provider 18 sends product information to the system user 20 by way of the information system 16. This information is targeted for specific characteristics of viewers and selected as a match to criteria supplied by the information provider. After sign up, the system user makes a commitment to view targeted advertising, possibly for a minimum period of time, and the selected targeted advertising is routed to the computer screen of the system user.

In one preferred embodiment of the invention, targeted information is sent to the system user when he logs on the network. In this configuration of the system, the targeted information would be displayed along a side or the top or the bottom of the computer screen, allowing the system user to continue using his computer for other applications, or to link to various connections on the network. In another preferred embodiment of the invention, a software program is downloaded to the system user's computer when he signs up for participation in the system or method of the invention. In that particular preferred embodiment, information could be sent to the system user while he was connected to the network, and the information sent to him could be displayed both while he is connected to the network, and also while he is not connected to the network. To do this, targeted information would be stored in memory and fed to the user's screen intermittently over a period of time. Enough information would be downloaded to the user's system to enable information which appears to be fresh to be displayed on the user's screen for a period of time. This downloading of information could be done in an autorefreshing step, by the installed system software automatically connecting to the network, typically in a low activity time of the night. In this embodiment of the system, the system user could order products by a click of any of a number of selection devices, such as a mouse or a keyboard, and this selection could be done while the system user is off line or connected to the network. If the system user is not connected to the user, the order would be placed when he next logs on the network, or the installed system software could automatically connect to the network without intervention of the system user.

The consumer lending partner 20 covers the cost of the sign up incentive paid to the system user. The consumer lending partner can be any entity who participates in this cycle by covering the cost of the sign up incentive paid to the system user. The lending partner can be the management fund itself, or any investor interested in making an investment for a payback of the investment and a return on the investment. This could be a bank, private investment fund, mutual funds, or others. Particularly well suited to this role is a consumer lender, such as bank or a number of banks, who also can offer credit accounts and/or other banking services to the system user. Consumer lending partners of this nature are continually seeking contact with parties who desire to open credit accounts. Consumer lenders pay to gain an introduction with potential customers, and such an introduction is particularly valuable if it includes information about the customer's income and occupation. For this reason, a consumer lending partner such as a bank who also offers credit card accounts would be uniquely qualified to benefit from the interrelationships of this system or method. The system user 16 would optionally agree to a credit contract.

Row 2 of FIG. 5 shows the activities related to the system user spending money or credits from his account to purchase goods, services, or to allocate funds to other purposes such as political entities or interest groups. Funds from the user's account are transferred to the management fund and routed to the information provider who will typically be a merchant, to pay for selected purchases. The information provider sends the product to the customer In row 2 of FIG. 5, the information provider pays the management fund a sales commission for each sale of products. The information provider 18 also pays the management fund a fee for the display of product information and that could possibly include a separate fee for information which the system user sought out based on leading information provided by the method and system of the invention.

Row 3, FIG. 5 shows ways in which the system user can earn additional credits for his account, which can be in the form of an internet currency, spendable on goods or services which are displayed using the method or system of the invention. If the system user views or downloads or links to other locations on the internet, he accumulates credit for viewing product information during this exploration. If he refers other customers to the system for sign up, he also earns additional credit. The system user could also choose to allocate funds from his account to other accounts that he selects. This could be to the account of political candidates, political parties, advocacy groups, or selected individuals. For instance, an account could be set up for victims of a fire, so that other system users could transfer funds from their account to the account of the victims of the fire. Fundraising campaigns could be organized in this way for individuals or charities. Other activities could result in incentives being paid, such as purchase of cell phones and phone services through the system, subscribing to e-mail services, additional banking services, and other forms of system participation.

Row 4 of FIG. 5 shows the last step in this cycle which illustrates the system or method of the invention. In this step, funds from the management fund are used to repay with interest the incentive which was originally paid to the system user for sign up with the system. If the system user has established a credit account with the consumer lending partner, the system user would at this time make payments with interest on the balance of the credit on his account, to the consumer lending partner. The system user can also purchase products by using their own credit card rather than one established through the consumer lending partner. In that case, the system user would be responsible to pay the principal and interest on their own credit card. If the system user were to establish a credit card account with the lending partner, then the system user may have the option of applying any accumulated funds in the system user account against their credit balance with the lending partner.

In this system or method of network participation, there are a number of benefits for the system user. The system user can receive an up front "cash" reward, immediately upon registering. No purchase is required, and becoming a member of the system would typically be free. The system user can earn more internet currency or credit in his account by simply viewing targeted advertisements, and purchasing products from information providers or merchants connected through the network to the management fund and the information system computer. A member may also earn credit for his account by referring other people to become members. Unlike other marketing plans, there is no stigma attached to introducing users, friends, or relatives to this program, since the program contains only benefits for new users. A further benefit for the system user is the ability to acquire brand name products and services for free or at heavily subsidized prices from the system or method. Another benefit to the system user is a customized shopping experience, with targeted product information which is based on the system users interests. This provides the convenience of preselected "best in class" products at lower prices due to the efficiency of the marketing system. Another option which would typically be included as a benefit for system users is the option of using free or reduced rate e-mail services from the system.

The information provider for the system would typically be a merchant selling goods or services. However, other information providers could provide information about subjects of interest to the system user. This could include information consistent with the system user's political persuasion, or about topics he is interested in such as groups which promote his views on issues. Charities could also utilize this service to reach members who are interested or likely to be interested in donating to that particular charity. The advantage to information providers of all types is the ability to more effectively target contacts, based on their actual spending patterns, usage behavior, geographic and personal demographic and psychographic profiles. This provides "closed-loop" advertising metrics. An advertiser is able to acquire information in which the ad impressions are directly related to purchasing and/or other behavior of a consumer.

The typical advertiser is also able to directly reach a community of online buyers with preferred demographic profiles. Through the use of ad storage and serving from the system user's hard drive, a rich multimedia advertising environment is made available to the system user, and is refreshed regularly, whether the system user is connected to the internet or not. The targeted nature of the advertising is designed to be helpful and personal for the system user, which is a benefit to the advertiser. His ads reach the intended market, at the right time, to and with optimal effectiveness.

An example of this might be when a system user was reminded on his computer screen that his or her wedding anniversary was coming up and that if he or she ordered something online now, it would arrive in time. This message might be displayed three weeks before the anniversary date. The anniversary date would be on record based upon the profile information which was submitted upon becoming a member. Along with the reminder of an approaching anniversary date, birth date, or other upcoming family information, product information would be displayed which was relevant to the person whose special date was approaching. For instance, if it was a $40^{th}$ anniversary approaching, a jewelry or watch merchant, or a golf equipment merchant might have ads which are displayed below the date reminder. If the system user had indicated that his wife was indifferent to jewelry but enjoys horseback riding, a merchant who sells products relevant to the horseback riding world might display an ad next to the date reminder.

Other examples of relevant information which could be shown to a system user are shown in FIG. 3. These could include ads for the hobby in which the system user is interested; the current price of selected stock along side a brokerage ad; a photo and short quote from a political figure whom the system user supported; a list of items which are presently being offered in online auctions alongside the current bid for those items, possibly showing also the system user's current bid for the items; a running total of current funds available in the system users account; a display of the system user's checking balance, along with a note from his bank offering other services; and the current price of stock in which the system user is interested.

As shown by these examples, this information goes beyond mere advertising because it is actually relevant to the system user, and of interest and desirable to him. He will view this information because it is information he has indicated he is interested in viewing. This is a great advantage to an advertiser, whose advertising efforts are often resented and can result in negative feelings when presented in the wrong context. In this system, the advertiser is part of the system which rewards desired behaviors in system users, i.e.: responding to ads, making purchases, viewing ads, all of which create a self reinforcing cycle.

The advertiser also has available to him real time in-depth reporting on advertising performance, brand awareness, and advertising tracking. The system provides qualitative message and creative testing, data mining services, and market research. These benefits are available in the version of the system in which the system user's activities are monitored, and each action of the system user on the internet is recorded and fed back to the information system computer for analysis.

The investor in this system benefits by participation in a very predictable and high-yielding investment plan. If the investment partner is also a consumer lender, then he is especially benefited by the relationships of the system or method. In that case, the management fund of the system or method acts as a proxy, repaying the principal and interest on the customer's up front reward through the advertising and commerce revenue streams associated with the system user. Use of this system allows the consumer lending partner to deliver targeted product offers with preapproved credit to selected groups of users with defined characteristics. This enables the system user to authorize the use of online credit and to complete purchase transactions with a simple click directly from the desktop interface, whether it be online or offline. For the consumer lending partner, this system addresses the largest problem that the consumer lender faces, that of customer qualifications and acquisition.

By participating in this system, the consumer lender has lower costs of acquisition of new customers than by traditional methods. Customer acquisition by this system or method capitalizes on the rapidly growing customer base of internet users, with excellent demographics and highly desirable financial profiles. Research has shown that 75% of online buyers have incomes of $50,000 per year or more. Many of them are also college students or young adults. Participating in this system also allows the lending partner to capture new entrants at the beginning of their credit life cycle. Revenue growth for the lending partner will be fueled by adding credit customers. The addition of customers will be generated by rapid adoption of the system, and growth of participation and membership in the system, and the rapid growth of internet based commerce.

The management entity of the system or method may also associate with information providers who are suppliers and affiliate partners, for supplying brand name products at excellent prices to system users. The suppliers and affiliate partners in this arrangement will gain significant additional revenue opportunities from the system transactions.

Purchasing behavior of the system user will be reinforced by the use of incentives, to the benefit of affiliate sites. Fees paid to the management fund can be used for ongoing subsidization of the cost of goods. This, in addition to the up front cash reward for sign up and participation will also fuel the cycle of internet commerce via the system.

The system provides an unusually streamlined purchase cycle. Targeted product promotion information is delivered direct to a customer, who can complete a purchase transaction by one click of a mouse, from an offline or online desktop interface. If these transactions are performed offline, the information involved in the transaction is uploaded the next time the system user logs on to the internet or other network. The anticipated rapid adoption of the system will create a significant buying community which can be directly targeted through the offline desktop interface with opportunities for direct links to affiliate sites and targeted ads.

While there is shown and described the present preferred embodiment of the invention, it is to be distinctly understood that this invention is not limited thereto but may be variously embodied to practice within the scope of the following claims.

From the foregoing description, it will be apparent that various changes may be made without departing from the spirit and scope of the invention as defined by the following claims.

We claim:

1. In an arrangement comprising at least one computer network, said network connecting at least one personal computer to at least one information-system computer, said personal computer being associated with at least one system user, a method for network participation, utilizing incentives and mutual reinforcements between a system user, an information provider, and an investor, said method comprising the steps of:

receiving funds in a management fund, from one or more investors, to be used for providing a viewing incentive to a system user;

providing a viewing incentive for a plurality of system users to participate in said network participation;

gathering system user profile information from said system users;

storing said system user profile information in a system user profile database on said information provider computer;

gathering product information from one or more information providers and storing it on said information-system computer;

providing said system users with product information for viewing on a computer screen in use by said system user;

receiving from said information providers a product information presentation fee which is paid into said management fund, for presenting information to said system users which said information providers have selected for such presentation;

providing said system users with a means of interacting with product information or advertising;

receiving a fee from said information providers for transactions which result from said product information presented to said system users; and paying one or more investor from said management fund to repay said investor for said viewing incentives paid to said system users.

2. The method of network participation of claim 1 which further comprises the step of receiving a commitment from said system users to view targeted information for a period of time.

3. The method of network participation of claim 1 in which further comprises the steps of:

gathering system user profile information from system users who are consumers who purchase goods and services; and receiving a commitment from said consumers users to view advertising information for goods and services for a period of time.

4. The method of network participation of claim 1 in which further comprises the steps of: providing consumers a means of interacting with product information by purchasing goods and services.

5. The method for network participation of claim 4 in which the step of providing said system users with a means of interacting with product information by purchasing goods and services further comprises an on-line payment means.

6. The method of network participation of claim 5 which further includes the step of providing credit for on-line purchases.

7. The method for network participation of claim 6 which further comprises the step of ordering a product by a system user, using one click of a selection device, when said system user is connected to said network, or not connected to said network.

8. The method of network participation of claim 1 in which further comprises the steps of:

comparing said system user profile information with said provided information;

providing said system users with information for viewing on a computer screen in use by said system user, in which said information is tailored to said system user based on a match between said system user profile information and said product information.

9. The method of network participation of claim 8 which further comprises the steps of:

providing said consumer profile information to an investor who is a consumer lending partner in order to pre-qualify said consumer for a credit account with said consumer lending partner; and allowing lender to make credit available to said consumers by providing credit account information from said consumer lending partner to said consumers on said computer screen.

10. The method for network participation of claim 9 which further comprises the step of paying a new account bounty to said management fund by said consumer lending partner for consumers who open a credit account with said consumer lending partner.

11. The method for network participation of claim 8 which further comprises the step of providing a means for system users to earn additional trading incentives based on hours of exposure to product information and advertising.

12. The method for network participation of claim 1 which further comprises the step of providing a means for system users to earn additional viewing incentives based upon exploration of product information.

13. The method for network participation of claim 1 which further comprises the step of providing a means for system users to earn additional viewing incentives based on hours of exposure to product information and exploration of product information.

14. The method for network participation of claim 1 which further comprises the step of providing a means for system users to earn additional viewing incentives based upon signup of referred new system users to said trading system by said system users.

15. The method for network participation of claim 1 which further comprises the step of providing incentives to said system user for system related activities.

16. The method for network participation of claim 15 in which the step of providing a viewing incentive for consumers to participate in said network participation further comprises providing selected goods or services provided by said information providers.

17. The method for network participation of claim 1 in which the step of providing a viewing incentive for system users to participate in said system further comprises an internet currency which can be used toward purchase of goods or services from said information providers.

18. The method for network participation of claim 1 which further comprises the step of displaying a number which represents a running total of said system user's current incentive total on said computer screen of said system user.

19. The method for network participation of claim 1 which further comprises the steps of;

sensing said system user's product information viewing activity;

transmitting information about said system user's product information viewing activity to said information-system computer; and dynamically adjusting product information provided to said system user according to said system user's product information viewing activity and system user profile information.

20. The method for network participation of claim 1 which further comprises the step of installing product information software on said system user's computer which has the ability to display product information to said consumer.

21. The method for network participation of claim 20 which further comprises the step of displaying stored product information to said system user when said system user's computer is or is not connected to said network.

22. The method for network participation of claim 21 which further comprises the step of refreshing said stored product information when said consumer connects to said network.

23. The method for network participation of claim 21 which further comprises the step of presenting changing product information to said system user, when said system user is or is not connected to said network, from said stored product information.

24. The method for network participation of claim 20 which further comprises the step of refreshing said stored product information by autorefreshing.

25. The method for network participation of claim 1 which further comprises the step of sensing said system user's internet activity, transmitting information about said system user's internet viewing activity to said information-system computer, and dynamically adjusting product information provided to said system user according to said system user's internet activity.

26. The method for network participation of claim 1 in which the step of providing said system users with a means of purchasing products from said information providers comprises an on-line product selection means.

27. In an arrangement comprising at least one computer network, said network connecting at least one personal computer to at least one information-system computer, said personal computer being associated with at least one computer user, a method for trading, utilizing incentives and mutual reinforcements between a consumer, a merchant, and a consumer lending partner, said method comprising the steps of:

receiving funds in a management fund, from one or more consumer credit partners, to be used for providing a trading incentive to a consumer;

providing a trading incentive for a plurality of consumers to participate in said trading;

gathering consumer profile information from said consumers;

storing said consumer profile information in a consumer profile database on said information provider computer;

receiving a commitment from said consumers to view targeted advertising for a period of time;

installing ad viewing and activity management software on said consumer's computer which has the ability to display product information to said consumer;

displaying stored product information to said consumer when said consumer's computer is or is not connected to said network;

refreshing said stored product information when said consumer connects to said network; gathering product information from one or more merchants and storing it on said information system computer;

comparing said consumer profile information with said product information;

providing said consumers with product information tailored to said consumer based on a match with said consumer profile information and said product information, for viewing on a computer screen in use by said consumer;

sensing said consumer's product viewing activity, and transmitting information about said consumer's product viewing activity to said information-system computer, and dynamically adjusting product information provided to said consumer according to said consumer's product viewing activity;

receiving from said merchants an advertising fee which is paid into a management fund, for product information which said merchants have provided to said consumers;

providing said consumers with an on-line means of purchasing products from said merchants;

receiving a sales fee from said merchants for sales transacted with said consumers;

providing said consumer profile information to said consumer lending partner in order to pre-qualify said consumer for a credit account with said consumer lending partner;

making credit available to said consumers by providing credit account information from said consumer lending partner to said consumers on said computer screen;

paying said consumer credit lender from said management fund to repay said consumer credit lender for said trading incentives initially paid to said consumers;

receiving into said management fund from said consumer lender partner a new account bounty by said consumer lending partner for consumers who open a credit account with said consumer lending partner;

providing a means for consumers to earn additional trading incentives based on exposure to product information; and providing a means for consumers to earn additional trading incentives based on signup of referred new consumers.

* * * * *